US009992122B2

(12) United States Patent
Hong

(10) Patent No.: US 9,992,122 B2
(45) Date of Patent: Jun. 5, 2018

(54) METHOD AND DEVICE FOR PROCESSING PACKET

(71) Applicant: Samsung Electronics Co., Ltd., Gyeonggi-do (KR)

(72) Inventor: Jinwoo Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 215 days.

(21) Appl. No.: 14/759,917

(22) PCT Filed: Jan. 8, 2014

(86) PCT No.: PCT/KR2014/000190
§ 371 (c)(1),
(2) Date: Jul. 8, 2015

(87) PCT Pub. No.: WO2014/109539
PCT Pub. Date: Jul. 17, 2014

(65) Prior Publication Data
US 2015/0358240 A1  Dec. 10, 2015

(30) Foreign Application Priority Data

Jan. 8, 2013  (KR) .................. 10-2013-0001921

(51) Int. Cl.
*H04L 12/28* (2006.01)
*G01R 31/08* (2006.01)
(Continued)

(52) U.S. Cl.
CPC ............. *H04L 47/20* (2013.01); *H04L 1/16* (2013.01); *H04L 12/1407* (2013.01); *H04L 45/38* (2013.01); *H04L 69/22* (2013.01)

(58) Field of Classification Search
CPC ....... H04L 47/20; H04L 1/16; H04L 12/1407; H04L 45/38; H04L 69/22; H04L 12/813

USPC ......................................... 370/410
See application file for complete search history.

(56) References Cited

U.S. PATENT DOCUMENTS 8,605,655 B1 * 12/2013 Sahai ................... H04M 15/66
370/328
2010/0186064 A1 * 7/2010 Huang ................... H04L 12/14
726/1
(Continued)

FOREIGN PATENT DOCUMENTS

JP        2010-535454      11/2010
KR    10-2008-0069535       7/2008
(Continued)

OTHER PUBLICATIONS

3GPP TS 29.212 v 10.9.0 Release 10, Policy and Charging Control (PCC) Reference points, ETSI TS 129 212 v10.9.0, Jan. 2013.*
(Continued)

*Primary Examiner* — Gerald Smarth

(57) ABSTRACT

The present invention relates to a method and a device for processing a packet. The method for processing a packet, according to one embodiment of the present invention, can comprise the steps of: receiving a packet processing rule that includes filter information and policy information corresponding to the filter information; obtaining preset lower filter information indicated by a filter name when the filter information contains the filter name; and processing a receiving packet according to the lower filter information and the policy information. According to the one embodiment of the present invention, it is possible to provide a device and a method for processing a packet, which can efficiently generate and apply a packet processing rule.

26 Claims, 6 Drawing Sheets

(51) Int. Cl.
      *H04L 12/813*     (2013.01)
      *H04L 12/721*     (2013.01)
      *H04L 29/06*      (2006.01)
      *H04L 12/14*      (2006.01)
      *H04L 1/16*       (2006.01)

(56) References Cited

U.S. PATENT DOCUMENTS

| | | |
|---|---|---|
| 2011/0106933 A1 | 5/2011 | Lovsen et al. |
| 2011/0122885 A1 | 5/2011 | Hedman et al. |
| 2012/0142306 A1* | 6/2012 | Shah ................. H04W 4/22 |
| | | 455/404.1 |
| 2012/0158872 A1* | 6/2012 | McNamee .......... H04L 67/1095 |
| | | 709/206 |

FOREIGN PATENT DOCUMENTS

| | | |
|---|---|---|
| KR | 10-2012-0049572 | 5/2012 |
| KR | 10-2012-0058200 | 6/2012 |

OTHER PUBLICATIONS

International Search Report dated Mar. 27, 2014 in connection with International Patent Application No. PCT/KR2014/000190, 4 pages.
Written Opinion of International Searching Authority dated Mar. 27, 2014 in connection with International Patent Application No. PCT/KR2014/000190, 7 pages.
3GPP TS 29.212 V11.4.0, "3rd Generation Partnership Project; Technical Specification Group Core Network and Terminals; Policy and Charging Control (PCC) over Gx/Sd Reference Point (Release 11)", Mar. 2012, 202 pages.

* cited by examiner

METHOD AND DEVICE FOR PROCESSING PACKET

CROSS-REFERENCE TO RELATED APPLICATION(S)

The present application claims priority under 35 U.S.C. § 365 to International Patent Application No. PCT/KR2014/000190 filed Jan. 8, 2014, entitled "METHOD AND DEVICE FOR PROCESSING PACKET", and, through International Patent Application No. PCT/KR2014/000190, to Korean Patent Application No. 10-2013-0001921 filed Jan. 8, 2013, each of which are incorporated herein by reference into the present disclosure as if fully set forth herein.

BACKGROUND OF THE INVENTION

1. Field of the Invention

The present invention relates to an apparatus and method of processing packets, and more particularly, to an apparatus and method of processing packets by the application of a packet processing rule.

2. Description of the Related Art

In recent years, with the rapid development of wired and wireless communication technologies, the number of subscribers signing up a single network has also increased. Since a large number of subscribers exist on the network, permission of access to the network, guarantee of packet processing rate and charge of expense need to be performed according to respective subscribers in difference.

Policy and Charging Rules Function (PCRF) provides differentiated policies to IP-Edge equipment of an access network and Deep Packet Inspection (DPI) equipment providing Traffic Detection Function (TDF), according to the respective subscribers. Examples of the IP-Edge equipment of an access network or examples of gateway equipment are: Packet Data Network Gateway (PDN-GW) of Long Term Evolution (LTE) network; Gateway GPRS Support Node (GGSN) of High Speed Packet Access (HSPA) network; Packet Data Serving Node (PDSN) or Code Division Multiple Access (CDMA) network; Access Service Network Gateway (ASN-GW) of mobile Worldwide Interoperability for Microwave Access (Wi-MAX) network; Evolved Packet Data Gateway (ePDG) of Interworking Wireless Local Area Network (I-WLAN); etc.

FIG. 1 shows a configuration of a 3GPP (3rd Generation Partnership Project) PCC (Policy and Charging Control) network.

Referring to FIG. 1, PCRF 110 determines a policy for a subscriber session and transmits the policy to one or more of the following: Policy and Charging Enforcement Function (PCEF) 145, Bearer Binding and Event Reporting Function (BBERF) 120 and TDF 130.

The PCEF 145 is included in a gateway 140. The PCEF 145 is a configuration provided by IP-Edge. The PCEF 145 performs a Quality of Service (QoS) function, a gating function, and a charging function according to a PCC rule received from the PCRF 110. When the PCEF 145 includes a function of the TDF 130, the PCEF 145 performs the QoS/gating function based on the Application Detection and Control (ADC) rule received from the PCRF 110.

The BBERF 120 exists when a Bearer Binding function is separated from the IP-Edge. The BBERF 120 performs a gating function and a QoS function according to a QoS rule received from the PCRF 110.

The TDF 130 detects a particular application and/or a protocol at the application level and performs a gating function and a QoS function according to an ADC rule received from the PCRF 110.

The Subscription Profile Repository (SPR) 150 manages the subscription profiles of respective subscribers. When User Data Convergence (UDC) structure is applied, the SPR 150 may be replaced by a User Data Repository (UDR). When UDR is used, the UDR cooperates with PCRF 120 through a Ud interface.

An Application Function (AF) 160 provides information about services used by the subscriber to the PCRF 110.

An Online Charging System (OCS) 170 performs a real time charging function. The OCS 170 cooperates with the PCRF 110 through an Sy interface to perform a QoS function, a gating function and a charging function, differently, depending on information about the balance of prepaid subscribers.

An Offline Charging System (OFCS) 180 performs a non-real time charging function.

The PCRF 110 provides a policy applied to the subscriber session in the form of a PCC/QoS/ADC rule to the PCEF 145, BBERF 120 and TDF 130. In the description, a PCC rule, QoA rule and ADC rule are commonly called the PCC/QoS/ADC rule. Rules to be used for the process of packets, such as PCC/QoS/ADC rule, can be commonly called packet processing rules. The PCC/QoS/AIDC rules are provided through a Gx/Gxx/Sd interface. The Gx/Gxx/Sd interface uses Attribute-Value Pairs (AVP) based on a Diameter protocol.

The transmission of the PCC/QoS/ADC rule is classified in two ways. A first method is an approach of a predefined rule where PCRF 110 provides a rule name of a pre-defined policy to the PCEF 145, BBERF 120 or TDF 130. A second method is an approach of a dynamic rule where PCRF 110 defines the entire rule and transfers all the configurations of the rule to the PCEF 145, BBERF 120 or TDF 130. Since the PCEF 145, BBERF 120 and TDF 130 process packets based on the rules transmitted from the PCRF 110, the PCEF 145, BBERF 120 and TDF 130 are commonly called a packet process apparatus.

PCC/QoS/ADC rules include the following two components.
1. Filter Information
2. QoS policy/gating policy/charging policy (however, QoS rule and ADC rule do not include a charging policy)

The filter information is referred to as information for the extraction of a packet to which a corresponding policy is applied. The filter information may include information about precedence for prioritizing among filters. The PCC rule and QoS rule are each comprised of five tuple information items. The ADC rule includes information about applications. In the following description, the QoS policy, the gating policy, and the charging policy are commonly called policy information. That is, the policy information is related to information about a method of processing packets, and may include one or more of the following: a QoS policy, gating policy and charging policy.

When packet processing rules are transmitted through the method of a predefined rule described above, PCRF 110 provides the names of predefined rules for all the packet processing rules to the PCEF 145, BBERF 120 or TDF 130. A rule corresponding to the rule name includes filter information and the corresponding policy information. According to a method of a predefined rule, for the same filter information, in order to apply two or more of the following: Qos policy, gating policy and charging policy which differ from each other, preset rules for respective polices need to have been previously defined. For example, PCRF 110 needs to define a first rule (including first filter information and first policy information) and a second rule (including first filter information and second policy information). Therefore, in order to provide a variety of differentiated policies, PCRF 110 need to define preset rules to which a plurality of packet processing polices for the same filter information (first filter information) are applied respectively. Similarly, in order to apply the same policy information to filter information items that differ from each other, PCRF 110 need to define preset rules corresponding to the filter information items. In general, the number of rules that can be defined in PCEF 145, BBERF 120 or the TDF 130 is restricted due to the limitation of the memory capacity, and may include an error while the operator directly sets up a plurality of predefined rules.

For example, if there are M policies for N filters (M and N are positive integers), the number of rules to be predefined is N×M, thereby covering the entire combination of the filters and the policies.

Filter Information
Filter 1: HTTP traffic
Filter 2: FTP traffic
Filter 3: Skype traffic
. . .
Filter N: YouTube traffic
Policy Information
Policy 1: QoS limitation, and volume-based offline charging
Policy 2: Traffic blocking
Policy 3: Traffic Redirect to the service provider's portal
. . .
Policy M: Not charging

SUMMARY OF THE INVENTION

The present invention has been made in view of the above problems, and provides an apparatus and method that efficiently creates a packet processing rule and processes packets by the application of the packet processing rule.

In accordance with an exemplary embodiment of the present invention, the present invention provides a method of processing packets comprising: receiving a packet processing rule that includes filter information and policy information corresponding to the filter information; obtaining, when the filter information contains a filter name, predefined sub-filter information indicated by the filter name; and processing received packets according to the sub-filter information and the policy information.

In accordance with another exemplary embodiment of the present invention, the present invention provides a method of processing packets comprising: receiving a packet processing rule that includes filter information and policy information corresponding to the filter information; obtaining, when the policy information contains a policy name, predefined sub-policy information indicated by the policy name; and processing received packets according to the filter information and the sub-policy information.

In accordance with another exemplary embodiment of the present invention, the present invention provides an apparatus for processing packets comprising: a communication unit for receiving a packet processing rule that includes filter information and policy information corresponding to the filter information; and a controlling unit for: obtaining, when the filter information contains a filter name, predefined sub-filter information indicated by the filter name; and processing received packets according to the sub-filter information and the policy information.

In accordance with another exemplary embodiment of the present invention, the present invention provides an apparatus for processing packets comprising: a communication unit for receiving a packet processing rule that includes filter information and policy information corresponding to the filter information; and a controlling unit for: obtaining, when the policy information contains a policy name, predefined sub-policy information indicated by the policy name; and processing received packets according to the filter information and the sub-policy information.

In accordance with another exemplary embodiment of the present invention, the present invention provides a method of transmitting a packet processing rule comprising: creating the packet processing rule that includes a filter name indicating sub-filter information adapted to a packet processing apparatus and policy information corresponding to the sub-filter information; and transmitting the packet processing rule to the packet processing apparatus.

In accordance with another exemplary embodiment of the present invention, the present invention provides a method of transmitting a packet processing rule comprising: creating the packet processing rule that includes filter information adapted to a packet processing apparatus and sub-policy information corresponding to the filter information; and transmitting the packet processing rule to the packet processing apparatus.

In accordance with another exemplary embodiment of the present invention, the present invention provides an apparatus for transmitting a packet processing rule comprising: a controlling unit for creating the packet processing rule that includes a filter name indicating sub-filter information adapted to a packet processing apparatus and policy information corresponding to the sub-filter information; and a communication unit for transmitting the packet processing rule to the packet processing apparatus.

In accordance with another exemplary embodiment of the present invention, the present invention provides an apparatus for transmitting a packet processing rule comprising: a control unit for creating the packet processing rule that includes filter information adapted to a packet processing apparatus and sub-policy information corresponding to the filter information; and a communication unit for transmitting the packet processing rule to the packet processing apparatus.

BRIEF DESCRIPTION OF THE DRAWINGS

The features and advantages of the invention will become more apparent from the following detailed description in conjunction with the accompanying drawings, in which.

DETAILED DESCRIPTION OF EXEMPLARY EMBODIMENTS

Hereinafter, embodiments of the present invention are described in detail with reference to the accompanying drawings.

Detailed descriptions of well-known functions and structures incorporated herein may be omitted to avoid obscuring the subject matter of the invention.

Although the drawings represent an embodiment of the invention, the drawings are not necessarily to scale and certain features may be exaggerated or omitted in order to better illustrate and explain the invention. The same reference numbers are used throughout the drawings to refer to the same or similar parts.

The following description explains a method of defining a predefined filter and a method of defining a predefined policy. A predefined policy may include one or more of the following: for example, a QoS policy, a gating policy and a charging policy. In the following description, a method that configures packet processing rules (e.g., PCC rule, QoS rule and ADC rule) by combining a proposed filter and a policy is also explained.

Figure 1:
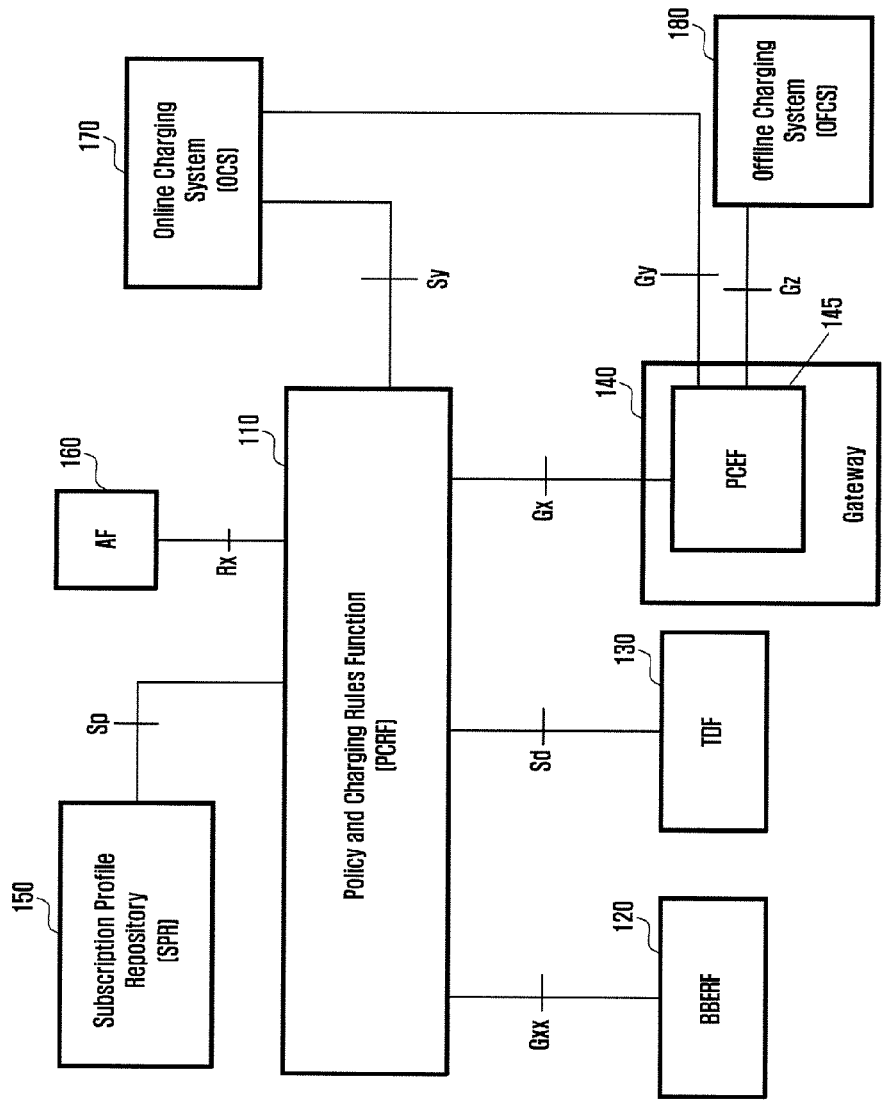
FIG. 1 shows a configuration of a 3GPP (3rd Generation Partnership Project) PCC (Policy and Charging Control) network.
Figure 2:
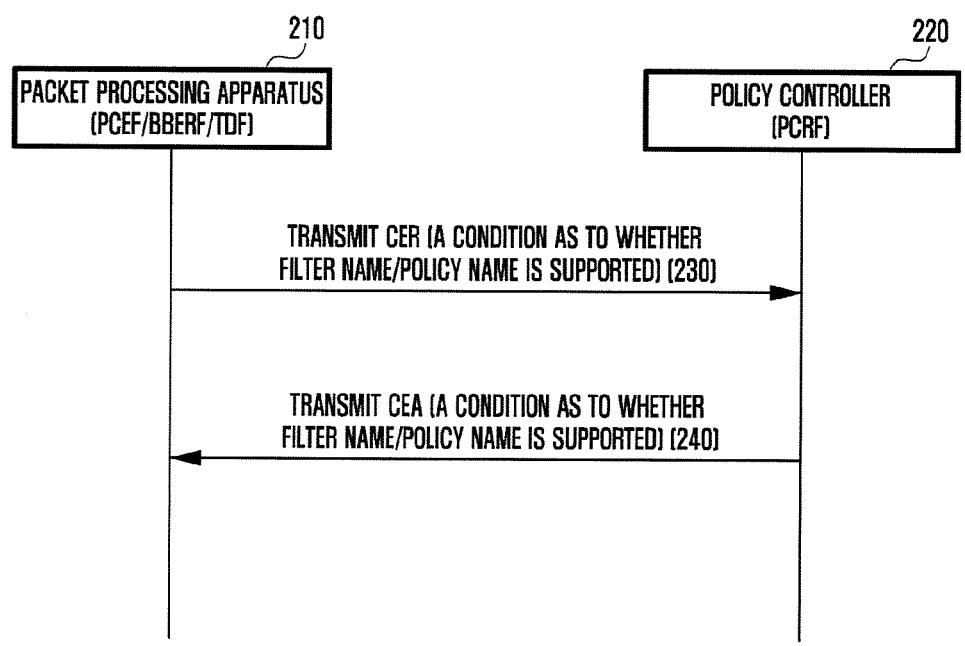
FIG. 2 is a flow chart that describes a capability exchange process according to an embodiment of the present invention.

FIG. 2 is a flow chart that describes a capability exchange process according to an embodiment of the present invention.

The capability exchange process shown in FIG. 2 is performed by a packet processing apparatus 210 and a policy controller 220. The packet processing apparatus 210 is a system for processing packets according to packet processing policy information provided by the policy controller 220. The packet processing apparatus 210 may include one or more of the following: for example, PCEF, BBERF, and TDF. The policy controller 220 is a device that provides packet processing policy information to the packet processing apparatus 210. The policy controller 220 may include, for example, PCRF. In the following description, although the packet processing apparatus 210 and the policy controller 220 will be described based on PCEF, BBERF, TDF, and PCRF as their typical examples, it should, however, be understood that the present invention is not limited thereto.

In the embodiment of FIG. 2, the packet processing apparatus 210 exchanges a condition as to whether a predefined filter is supported and a condition as to whether a predefined policy is supported with the policy controller 220 at a time point that Gx/Gxx/Sd connection is established.

In the embodiment of FIG. 2, the packet processing apparatus 210 transmits a message, Capabilities-Exchange-Request (CER), to the policy controller 220 in a diameter connection establishment in operation 230. The CER message includes indicators indicating whether a predefined filter is supported and whether a predefined policy is supported. The indicator may be configured in the form as shown in the following table 1 or 2.

TABLE 1

| Indicator (binary number) | Predefined filter | Predefined policy |
| --- | --- | --- |
| 00 | Not supported | Not supported |
| 01 | Not supported | Supported |
| 10 | Supported | Not supported |
| 11 | Supported | Supported |

TABLE 2

| Indicator (binary number) | Predefined filter and predefined policy |
| --- | --- |
| 0 | Both not supported |
| 1 | Both supported |

Although the indicator of the embodiment is implemented in the form of binary numbers as described in tables 1 and 2, it should be understood that the present invention may also employ other types of indicators. In table 1, the conditions as to whether a predefined filter is supported and whether a predefined policy is supported are independent on each other. In table 2, the conditions as to whether a predefined filter is supported and whether a predefined policy is supported are dependent on each other. That is, when a system supports a predefined filter as shown in table 2, it means that the system supports a predefined policy.

For example, when the packet processing apparatus 210 supports a predefined filter and a predefined policy, it includes indicators, indicating that a predefined filter and a predefined policy are supported, in the CER message. Accordingly, when a CER message does not include indicators indicating that a predefined filter and a predefined policy are supported, it means that the packet processing apparatus 210 does not support a predefined filter and a predefined policy.

The policy controller 220 transmits a message, Capabilities-Exchange-Answer (CEA), to the pocket processing apparatus 210 in operation 240. The CEA message includes an indicator indicating whether the policy controller 220 supports a predefined filter and a predefined policy. The indicator may be configured in the form as shown in the following table 1 or 2. The type of indicator used in operation 240 may be identical or similar to that in operation 230 or may differ from that in operation 230. For example, when the policy controller 220 supports a predefined filter and a predefined policy, it includes indicators, indicating that a predefined filter and a predefined policy are supported, in the CEA message.

After completing the procedure of FIG. 2, the policy controller 220 and the packet processing apparatus 210 may determine whether to make applications of a predefined filter and a predefined policy. For example, when the policy controller 220 and the packet processing apparatus 210 support a predefined filter and a predefined policy, they can make communication by application of a predefined filter and a predefined policy. On the contrary, when the policy controller 220 and the packet processing apparatus 210 do not support a predefined filter and/or a predefined policy, they can make communication without application of a predefined filter and a predefined policy.

The operations related to PCC/QoS/ADC rules are performed according to the procedure well-known in the art. In the process, a predefined filter and a predefined policy using the filter name and policy name may be applied. The filter name is an identifier of a predefined filter and the policy name is an identifier of a predefined policy.

Predefined filter is defined as follows.

The packet processing apparatus 210 sets, to each Filter Name, one or more of the following: corresponding Flow-Information, Precedence, and TDF-Application-Identifier. PCEF and BBERF of the packet processing apparatus 210 may set Flow-Information and/or Precedence to each filter name. PCEF and TDF of the packet processing apparatus 210 may set TDF-Application-Identifier to each Filter Name.

The policy controller 220 sets information about the Filter Name.

In the process where the policy controller 220 configures the packet processing rule, when the packet processing rule includes a filter name, or when a predefined filter is used, information items that can be replaced with the predefined filter, e.g., flow-information, precedence, and TDF-Application-Identifier, are not included in a packet processing rule. That is, information items determined by the filter names are not additionally included in the packet processing rule but are replaced with the filter names.

When a packet processing rule that the packet processing apparatus 210 received from the policy controller 220 includes filter names or when a predefined filter is used, information about a corresponding predefined filter is applied to a corresponding policy name. PCEF and BBERF of the packet processing apparatus 210 may apply Flow-Information and/or Precedence to a corresponding policy name. PCEF and TDF of the packet processing apparatus 210 may apply TDF-Application-Identifier to a corresponding policy name. A packet processing rule may include one or more of the following: for example, Charging-Rule-Definition, QoS-Rule-Definition, and ADC-Rule-Definition.

Predefined policy is defined as follows.

The packet processing apparatus 210 may set, to each policy name, one or more of the following: corresponding QoS-Information, Flow-Status, AF-Charging-Identifier, Reporting-Level, Online, Offline, Metering-Method and Redirection-Information. PCEF, BBERF and TDF of the packet processing apparatus 210 may set, to each policy name, QoS-Information and/or Flow-Status. PCEF of the packet processing apparatus 210 may set, to each policy name, one or more of the following: AF-Charging-Identifier, Reporting-Level, Online, Offline, and Metering-Method. TDF of the packet processing apparatus 210 may set Redirection-Information to each policy name.

The policy controller 220 sets information about the policy name.

In the process where the policy controller 220 configures the packet processing rule, when the packet processing rule includes a policy name, or when a predefined policy is used, information that can be replaced with the policy name, e.g., QoS-Information, Flow-Status, AF-Charging-Identifier, Reporting-Level, Online, Offline, Metering-Method and Redirection-Information, is not included in a packet processing rule. That is, information items determined by the policy names are not additionally included in the packet processing rule but are replaced with the policy names.

When a packet processing rule that the packet processing apparatus 210 received from the policy controller 220 includes policy names or when a predefined policy is used, information about a corresponding predefined policy is applied to a corresponding policy name. PCEF, BBERF and TDF of the packet processing apparatus 210 may apply QoS-Information and/or Flow-Status to a corresponding policy name. PCEF of the packet processing apparatus 210 may apply, to a corresponding policy name, one or more of the following: AF-Charging-Identifier, Reporting-Level, Online, Offline, and Metering-Method. TDF of the packet processing apparatus 210 may apply Redirection-Information to a corresponding policy name. A packet processing rule may include one or more of the following: for example, Charging-Rule-Definition, QoS-Rule-Definition, and ADC-Rule-Definition.

The following description explains a combination of a predefined filter, a predefined policy, a dynamic filter and a dynamic policy.

As a first example of the combination, the policy controller 220 may configure a combination of the predefined filter and predefined policy in such a way that it includes a filter name and a policy name in a packet processing rule when setting the packet processing rule. In that case, the packet processing rules may have the same format such as the (first filter name, first policy name).

As a second example of the combination, when a packet processing rule is set, the policy controller 220 may configure the packet processing rule in such a way that it includes a filter name in the packet processing rule to make an application of a predefined filter, and simultaneously includes sub-policy details configuring policy information. When PCEF, BBERF or TDF of the packet processing apparatus 210 receives the packet processing rule, the sub-policy details configuring the policy information may include QoS-information and/or Flow-Status. When PCEF of the packet processing apparatus 210 receives the packet processing rule, the sub-policy details configuring the policy information may include one or more of the following: AF-Charging-Identifier, Reporting-Level, Online, Offline, and Metering-Method. When TDF of the packet processing apparatus 210 receives the packet processing rule, the sub-policy details configuring the policy information may include Redirection-Information. In that case, dynamic policy information is used along with a predefined filter corresponding to the filter name.

When the policy controller 220 sets a packet processing rule, it may configure the packet processing rule in such a way that it includes a policy name in the packet processing rule to make an application of a predefined policy, and simultaneously includes sub-filter information configuring filter information in the packet processing rule. When PCEF or BBERF of the packet processing apparatus 210 receives the packet processing rule, the sub-filter information configuring the filter information may include Flow-Information and/or Precedence. When PCEF or TDF of the packet processing apparatus 210 receives the packet processing rule, the sub-filter information configuring the filter information may include TDF-Application-Identifier. In that case, a dynamic filter is used along with a predefined policy corresponding to the policy name.

Figure 3:
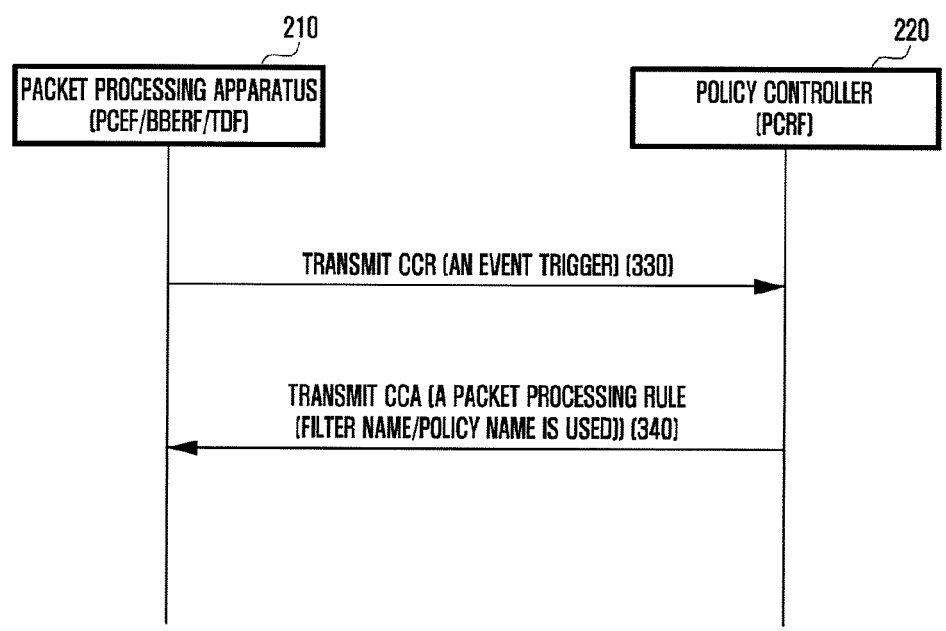
FIG. 3 is a flow chart that describes a process (PULL MODE) of changing a packet processing rule by an event trigger of a packet processing apparatus 210 according to an embodiment of the present invention.

FIG. 3 is a flow chart that describes a process (PULL MODE) of changing a packet processing rule by an event trigger of a packet processing apparatus 210 according to an embodiment of the present invention.

Figure 4:
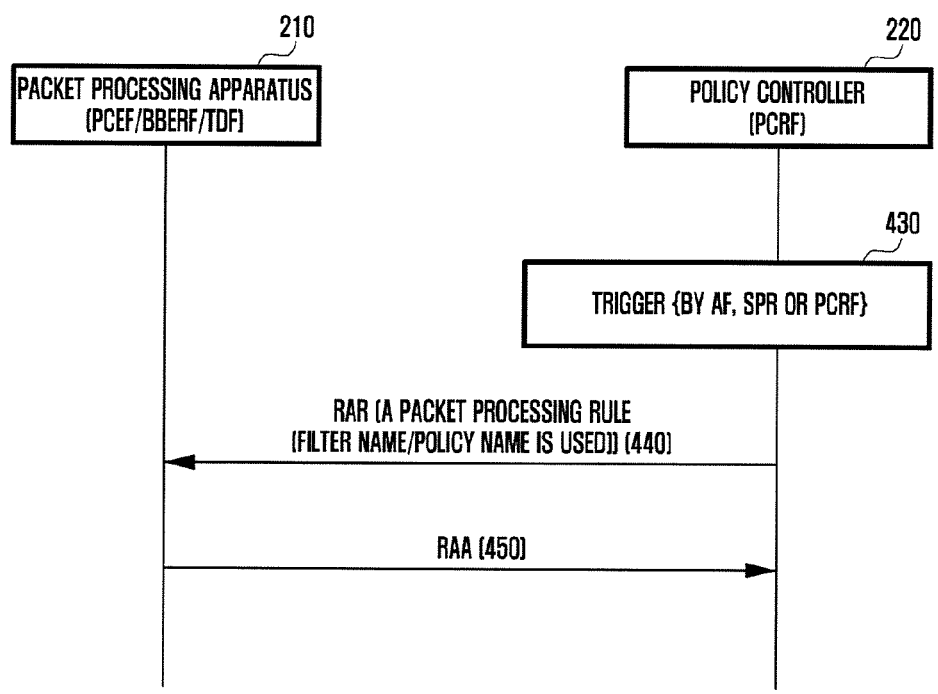
FIG. 4 is a flow chart that describes a process (PUSH MODE) of changing a packet processing rule by a trigger of the policy controller 220, Application Function (AF), or Subscription Profile Repository (SPR) according to an embodiment of the present invention.

Referring to FIG. 3, the packet processing apparatus 210 detects an event that occurred in specific Internet Protocol Connectivity Access Network (IP-CAN) session. In the embodiment of FIG. 3, the packet processing apparatus 210 determines that it needs to alter part of the policy information and/or the filter information of the packet processing rule in response to the event. In that case, the packet processing apparatus 210 transmits an event triggering message to the policy controller 220 in operation 330. In that case, the event triggering message may be included in a message, for example, Credit Control Request (CCR) and transmitted. When receiving the event triggering message, the policy controller 220 transmits a packet processing rule required for alteration to the packet processing apparatus 210 in response to the received message in operation 340. In that case, the packet processing rule may be included in, for example, Credit Control Answer (CCA), and transmitted. As such, the policy controller 220 may need to alter the packet processing rule that has been set by the packet processing apparatus 210. In that case, the filter name of a predefined filter and/or the policy name of a predefined policy as a sub-configuration component of the altered packet processing rule may be used. For example, although information about a predefined policy has been used, when the policy needs to be altered and there is not a predefined policy to be applied after the alteration of the policy, the policy information in the format of dynamic policy may be included in the packet processing rule and transmitted. FIG. 4

FIG. 4 is a flow chart that describes a process (PUSH MODE) of changing a packet processing rule by a trigger of the policy controller 220, Application Function (AF), or Subscription Profile Repository (SPR) according to an embodiment of the present invention.

Referring to FIG. 4, the policy controller 220 detects an event trigger of the policy controller 220, AF or SPR in operation 430. In this embodiment, the policy controller 220 has to change a packet processing rule of the packet processing apparatus 210 in response to the event trigger. The policy controller 220 transmits the packet processing rule to be applied to the packet processing apparatus 210 in operation 440. The packet processing rules may be included in the Re-Auth-Request (RAR) message and transmitted. The packet processing apparatus 210 transmits an ACK message indicating that it has received the packet processing rule to the policy controller 220 in operation 450. The ACK message may have a format of, for example, Re-Auth-Answer (RAA). The packet processing rule may include a filter named of the predefined filter and/or a policy name of the predefined policy as described above. When the packet processing rule that the packet processing apparatus 210 received from the policy controller 220 contains a filter name, the packet processing apparatus 210 applies information about a predefined filter corresponding to the filter name. Similarly, when the packet processing rule that the packet processing apparatus 210 received from the policy controller 220 contains a policy name, the packet processing apparatus 210 applies information about a predefined policy corresponding to the policy name.

In the embodiment, the packet processing apparatus 210 may include one or more of the following: PCEF, BBERF and TDF. The policy controller 220 may include PCRF.

After one of the procedures shown in FIGS. 2 to 4, the packet processing apparatus 210 analyzes the received packets according to the set, packet processing rule, and processes packets corresponding to filter information included in the packet processing rule by applying a policy corresponding to the filter information thereto.

Figure 5:
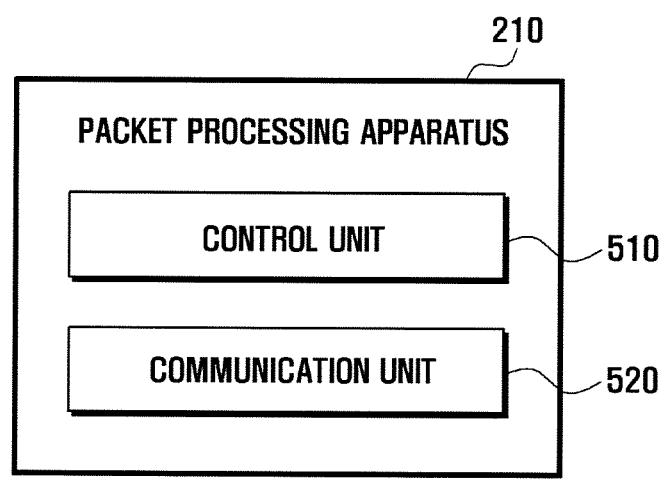
FIG. 5 is a block diagram of a packet processing apparatus 210 according to an embodiment of the present invention.

FIG. 5 is a block diagram of a packet processing apparatus 210 according to an embodiment of the present invention.

The packet processing apparatus 210 includes a control unit 510 and a communication unit 520. The communication unit 520 receives a packet processing rule. The communication unit 520 transmits/receives messages required to perform the embodiments described above. The control unit 510 applies a packet processing rule received through the communication unit 520, to packets, according to one of the ways in the embodiments of FIGS. 2 to 4, and processes the packets according to the packet processing rule. The control unit 510 performs control operations for the embodiments described above.

Figure 6:
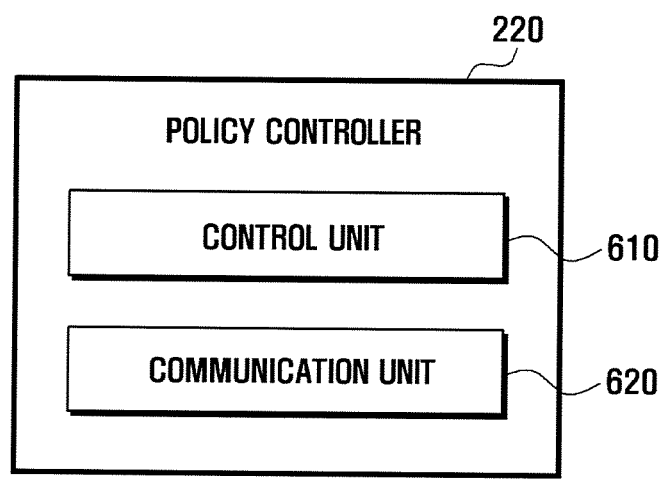
FIG. 6 is a block diagram of a policy controller 220 according to an embodiment of the present invention.

FIG. 6 is a block diagram of a policy controller 220 according to an embodiment of the present invention.

The policy controller 220 includes a control unit 610 and a communication unit 620. The control unit 610 creates a packet processing policy according to the request of the policy controller 220 or other entities and transmits the created policy to the packet processing apparatus 210 through the communication unit 620. The control unit 610 performs control operations for the embodiments described above. The communication unit 620 transmits the packet processing policy to the packet processing apparatus 210 under the control of the control unit 610. The communication unit 620 transmits/receives messages required to perform the embodiments described above.

According to one embodiment of the present invention, the apparatus and method can efficiently create a packet processing rule and process packets by application of the packet processing rule.

It should be understood that the blocks and the operations shown in the drawings can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flow chart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow chart therein. In addition, since the computer programming instructions can also be installed to computers or data processing equipment that can be programmed, they can create processes that perform a series of operations therein, described in the blocks of the flow chart therein.

The blocks of the flow chart refer to part of codes, segments or modules that include one or more executable instructions to perform one or more logic functions. It should be noted that the functions described in the blocks of the flow chart may be performed in a different order from the embodiments described above. For example, the functions described in two adjacent blocks may be performed at the same time or in reverse order.

In the embodiments, the terminology, component '~unit,' refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

Although embodiments of the invention have been described in detail hereinabove, it should be understood that many variations and modifications of the basic inventive concept herein described, which may be apparent to those skilled in the art, will still fall within the spirit and scope of the embodiments of the invention as defined in the appended claims.

The terms or words described in the description and the claims should not be limited by a general or lexical meaning, instead should be analyzed as a meaning and a concept through which the inventor defines and describes the invention to the best of his/her ability, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

What is claimed is:

1. A method of processing packets by a packet processing apparatus, the method comprising:
receiving, from a policy controller, a packet processing rule that includes filter information and policy information corresponding to the filter information;
determining whether the filter information includes a filter name indicating a predefined filter between the packet processing apparatus and the policy controller;
identifying, if the filter information includes the filter name, predefined sub-filter information corresponding to the predefined filter; and
processing received packets according to the sub-filter information and the policy information.

2. The method of claim 1, further comprising:
determining whether the policy information includes a policy name indicating a predefined policy between the packet processing apparatus and the policy controller;
identifying, if the policy information includes the policy name, predefined sub-policy information corresponding to the predefined policy; and
processing received packets according to the filter information and the sub-policy information.

3. The method of claim 2, further comprising:
transmitting a capability exchange request (CER) message that includes an indicator indicating whether a packet processing rule is supported by using a filter name indicating predefined sub-filter information and/or a policy name indicating predefined sub-policy information.

4. The method of claim 2, wherein the sub-policy information comprises at least one of QoS-information, flow-status, AF-charging-identifier, reporting-level, online, offline, metering-method and redirection-information, and
if the policy information includes the policy name, the sub-policy information is not included in the received policy information.

5. The method of claim 1, wherein the sub-filter information comprises at least one of flow-information, precedence, and TDF-application-identifier, and
if the filter information includes the filter name, the sub-filter information is not included in the received filter information.

6. A method of processing packets by a packet processing apparatus, the method comprising:
receiving a packet processing rule that includes filter information and policy information corresponding to the filter information;
determining whether the policy information includes a policy name indicating a predefined filter between the packet processing apparatus and a policy controller;
identifying, if the policy information includes the policy name, predefined sub-policy information corresponding to the predefined policy; and
processing received packets according to the filter information and the sub-policy information.

7. The method of claim 6, wherein the sub-policy information comprises at least one of QoS-information, flow-status, AF-charging-identifier, reporting-level, online, offline, metering-method and redirection-information, and
if the policy information includes the policy name, the sub-policy information is not included in the received policy information.

8. A packet processing apparatus for processing packets, the packet processing apparatus comprising:
a transceiver configured to receive and transmit a signal; and
at least one processor coupled with the transceiver and configured to control the transceiver to receive a packet processing rule that includes filter information and policy information corresponding to the filter information, determine whether the filter information includes a filter name indicating a predefined filter between the packet processing apparatus and a policy controller, identify, if the filter information includes the filter name, predefined sub-filter information corresponding to the predefined filter, and process received packets according to the sub-filter information and the policy information.

9. The packet processing apparatus of claim 8, wherein the at least one processor is further configured to determine whether the policy information includes a policy name indicating a predefined policy between the packet processing apparatus and the policy controller, identify, if the policy information includes the policy name, predefined sub-policy information corresponding to the predefined policy, and process received packets according to the filter information and the sub-policy information.

10. The packet processing apparatus of claim 9, wherein the at least one processor is further configured to control the transceiver to transmit a capability exchange request (CER) message that includes an indicator indicating whether a packet processing rule is supported by using a filter name indicating predefined sub-filter information and/or a policy name indicating predefined sub-policy information.

11. The packet processing apparatus of claim 9, wherein the sub-policy information comprises at least one of QoS-information, flow-status, AF-charging-identifier, reporting-level, online, offline, metering-method and redirection-information, and
if the policy information includes the policy name, the sub-policy information is not included in the received policy information.

12. The packet processing apparatus of claim 8, wherein the sub-filter information comprises at least one of flow-information, precedence, and TDF-application-identifier, and
if the filter information includes the filter name, the sub-filter information is not included in the received filter information.

13. A packet processing apparatus for processing packets comprising:
a transceiver configured to receive and transmit a signal; and
at least one processor coupled with the transceiver and configured to control the transceiver to receive a packet processing rule that includes filter information and policy information corresponding to the filter information, determine whether the policy information includes a policy name indicating a predefined filter between the packet processing apparatus and a policy controller, identify, if the policy information contains a policy name, predefined sub-policy information corresponding to the predefined policy, and processing received packets according to the filter information and the sub-policy information.

14. The packet processing apparatus of claim 13, wherein the sub-policy information comprises at least one of QoS-information, flow-status, AF-charging-identifier, reporting-level, online, offline, metering-method and redirection-information, and
if the policy information includes the policy name, the sub-policy information is not included in the received policy information.

15. A method of transmitting a packet processing rule by a policy controller, the method comprising:
generating a packet processing rule that includes filter information and policy information corresponding to the filter information; and
transmitting the packet processing rule to a packet processing apparatus,
wherein whether the filter information includes a filter name indicating a predefined filter between the packet processing apparatus and a policy controller is determined, by the packet processing apparatus, if the filter information includes the filter name, predefined sub-filter information corresponding to the predefined filter is identified and received packets according to the sub-filter information and the policy information is processed.

16. The method of claim 15, wherein the policy information comprises:
a policy name indicating sub-policy information that configures the policy information.

17. The method of claim 16, further comprising:
receiving, from the packet processing apparatus, a capability exchange request (CER) message that includes an indicator indicating whether a packet processing rule is supported by using a filter name corresponding to predefined sub-filter information and a policy name corresponding to predefined sub-policy information; and
transmitting, to the packet processing apparatus, a packet processing rule by using the filter name and the policy name, only when the indicator indicates that the packet processing rule is supported by using a filter name corresponding to predefined sub-filter information and a policy name corresponding to predefined sub-policy information.

18. The method of claim 15, wherein the sub-filter information comprises at least one of flow-information, precedence, and TDF-application-identifier, and
if the filter information includes the filter name, the sub-filter information is not included in the received filter information.

19. A method of transmitting a packet processing rule by a policy controller, the method comprising:
generating the packet processing rule that includes filter information and policy information; and
transmitting the packet processing rule to a packet processing apparatus,
wherein whether the policy information includes a policy name indicating a predefined filter between the packet processing apparatus and a policy controller is determined, by the packet processing apparatus, if the filter information includes the policy name, predefined sub-policy information corresponding to the predefined filter is identified and received packets according to the sub-policy information and the policy information is processed.

20. The method of claim 19, wherein the sub-policy information comprises at least one of QoS-information, flow-status, AF-charging-identifier, reporting-level, online, offline, metering-method and redirection-information, and
if the policy information includes the policy name, the sub-policy information is not included in the received policy information.

21. A policy controller for transmitting a packet processing rule, the policy controller comprising:
a transceiver configured to transmit and receive a signal; and
at least one processor coupled with the transceiver and controller configured to generate a packet processing rule that includes filter information and policy information corresponding to the filter information, and control the transceiver to transmit the packet processing rule to a packet processing apparatus,
wherein whether the filter information includes a filter name indicating a predefined filter between the packet processing apparatus and a policy controller is determined, by the packet processing apparatus, if the filter information includes the filter name, predefined sub-filter information corresponding to the predefined filter is identified and received packets according to the sub-filter information and the policy information is processed.

22. The policy controller of claim 21, wherein the policy information comprises:
a policy name indicating sub-policy information that configures the policy information.

23. The policy controller of claim 22, wherein the transceiver is further configured to:
receive, from the packet processing apparatus, a capability exchange request (CER) message that includes an indicator indicating whether a packet processing rule is supported by using a filter name corresponding to predefined sub-filter information and a policy name corresponding to predefined sub-policy information; and
transmit, to the packet processing apparatus, a packet processing rule by using the filter name and the policy name, only when the indicator indicates that the packet processing rule is supported by using a filter name corresponding to predefined sub-filter information and a policy name corresponding to predefined sub-policy information.

24. The policy controller of claim 21, wherein the sub-filter information comprises at least one of flow-information, precedence, and TDF-application-identifier, and
if the filter information includes the filter name, the sub-filter information is not included in the received filter information.

25. A policy controller for transmitting a packet processing rule, the policy controller comprising:
a transceiver configured to transmit and receive a signal; and
at least one processor coupled with the transceiver and configured to generate a packet processing rule that includes filter information and policy information corresponding to the filter information, and control the transceiver to transmit the packet processing rule to a packet processing apparatus, wherein whether the policy information includes a policy name indicating a predefined filter between the packet processing apparatus and a policy controller is determined, by the packet processing apparatus, if the filter information includes the policy name, predefined sub-policy information corresponding to the predefined filter is identified and received packets according to the sub-policy information and the policy information is processed.

26. The policy controller of claim 25, wherein the sub-policy information comprises at least one of QoS-information, flow-status, AF-charging-identifier, reporting-level, online, offline, metering-method and redirection-information, and if the policy information includes the policy name, the sub-policy information is not included in the received policy information.

* * * * *